United States Patent [19]

Sommerfeld

[11] Patent Number: 4,955,766
[45] Date of Patent: Sep. 11, 1990

[54] HOLDING FIXTURE FOR DRILLING POCKET JOINTS

[76] Inventor: Craig A. Sommerfeld, Rte. 1, Kelley, Iowa 50134

[21] Appl. No.: 432,157

[22] Filed: Nov. 6, 1989

[51] Int. Cl.⁵ .............................. B23B 47/28
[52] U.S. Cl. ........................ 408/87; 408/97; 408/103; 408/241 S
[58] Field of Search ............. 269/228; 408/87, 97, 408/103, 115 R, 115 B, 202, 241 S, 224, 225

[56] References Cited

U.S. PATENT DOCUMENTS

| | | | |
|---|---|---|---|
| 1,128,970 | 2/1915 | Godefroy et al. | 408/97 |
| 2,436,941 | 3/1948 | Sendoykas | 269/228 |
| 2,574,281 | 11/1951 | Olson | 269/228 |
| 3,708,237 | 1/1973 | Kruse | 408/115 R |
| 3,735,972 | 5/1973 | Blatt | 269/228 |
| 4,466,601 | 8/1984 | Raines | 269/79 |
| 4,759,666 | 7/1988 | Grab | 408/115 B |
| 4,842,453 | 6/1989 | Raines et al. | 408/115 R |

FOREIGN PATENT DOCUMENTS

| | | | |
|---|---|---|---|
| 302233 | 12/1954 | Switzerland | 408/202 |
| 840702 | 7/1960 | United Kingdom | 408/202 |

*Primary Examiner*—Daniel W. Howell
*Attorney, Agent, or Firm*—Henderson & Sturm

[57] ABSTRACT

A holding fixture for drilling pocket joints with a stepped drill bit. The fixture includes an L-shaped body member having a guide leg that carries an angularly disposed drill guide channel and a clamp leg that supports a clamping mechanism for securing a wooden workpiece flush against the planar surface of the guide leg. The drill guide channel has an upper stop flange and a lower end that terminates flush with the planar surface of the guide leg at a point spaced above the junction of the guide leg and the clamp leg. The stepped drill bit is secured in the chuck of a portable drill and an adjustable stop collar is positioned on the bit. The stop collar engages the stop flange so that the end of the bit is prevented from contacting the surface of the clamp leg. The wooden workpiece is secured flush to the planar surface of the guide leg by the clamp and the pocket and pilot hole are drilled.

3 Claims, 2 Drawing Sheets

HOLDING FIXTURE FOR DRILLING POCKET JOINTS

TECHNICAL FIELD

This invention relates to fixtures used in woodworking, and more particularly to holding fixtures for preparing pocket joints.

BACKGROUND ART

Known devices for preparing pocket joints in wooden workpieces include complex specialized equipment that is expensive to acquire and maintain and attachments for complex pieces of equipment such as a drill press. Also, known devices allow a spacing between the drill bit guide and the workpiece that in turn allows the bit to flex or "walk" which causes erratic cutting and damage to the bit.

Those concerned with these and other problems recognize the need for an improved holding fixture for drilling pocket joints.

DISCLOSURE OF THE INVENTION

The present invention provides a holding fixture for drilling pocket joints with a stepped drill bit. The fixture includes an L-shaped body member having a guide leg that carries an angularly disposed drill guide channel and a clamp leg that supports a clamping mechanism for securing a wooden workpiece flush against the planar surface of the guide leg. The drill guide channel has an upper stop flange and a lower end that terminates flush with the planar surface of the guide leg at a point spaced above the junction of the guide leg and the clamp leg. The stepped drill bit is secured in the chuck of a portable drill and an adjustable stop collar is positioned on the bit. The stop collar engages the stop flange so that the end of the bit is prevented from contacting the surface of the clamp leg. The wooden workpiece is secured flush to the planar surface of the guide leg by the clamp and the pocket and pilot hole are drilled.

An object of the present invention is the provision of an improved holding fixture for drilling pocket joints.

Another object is to provide a holding fixture that is portable and can be used with a portable hand drill.

A further object of the invention is the provision of a holding fixture that does not require a cumbersome machine or time consuming set ups.

Still another object is to provide a holding fixture that produces a perfect pocket and pilot hole without leaving a burr on the workpiece.

A still further object of the present invention is the provision of a holding fixture that is easy to operate and inexpensive to maintain.

Yet another object is to provide a holding fixture that is compact and durable.

BRIEF DESCRIPTION OF THE DRAWINGS

These and other attributes of the invention will become more clear upon a thorough study of the following description for the best mode for carrying out the invention, particularly when reviewed in conjunction with the drawings, wherein.

BEST MODE FOR CARRYING OUT THE INVENTION

Figure 1:
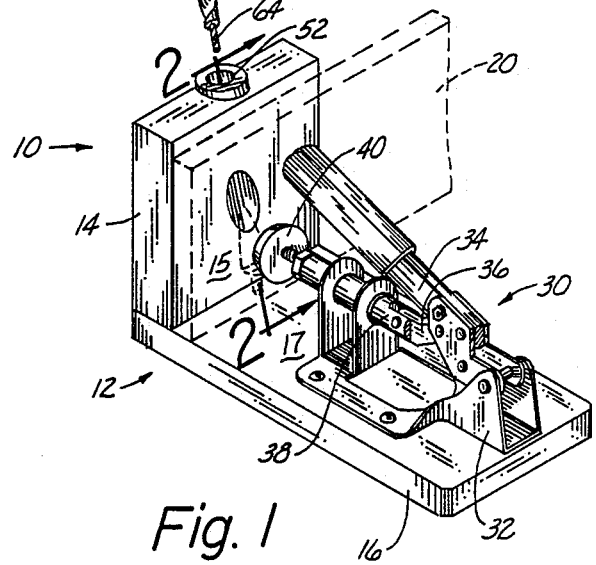
FIG. 1 is a perspective view of the holding fixture of the present invention wherein the stepped drill bit is powered by a portable hand drill.
Figure 4:
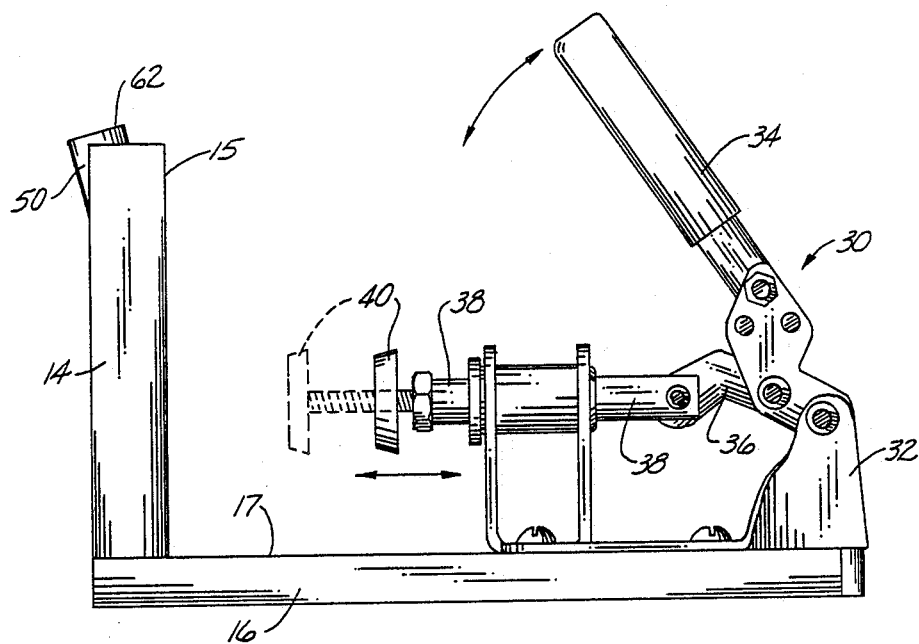
FIG. 4 is an enlarged side elevational view showing the toggle clamp in the released position and illustrating the adjustable foot in a retracted (full line) and an extended (dashed line) position.
Figure 5:
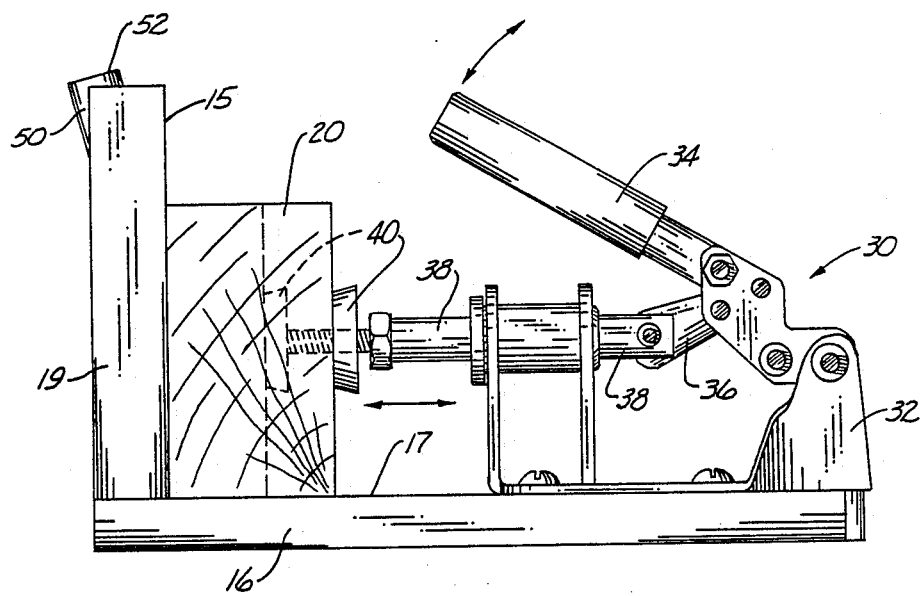
FIG. 5 is an enlarged side elevational view similar to FIG 4, but showing the toggle clamp in the engaged position holding a workpiece and illustrating the retracted and extended adjustments of the foot to secure workpieces of different thicknesses.

Referring now to the drawings, wherein like reference numerals designate identical or corresponding parts throughout the several views, FIG. 1 shows the holding fixture (10) of the present invention. The fixture (10) includes an L-shaped body member (12) having a guide portion (14) and a clamp portion (16) that are joined at a 90° junction. The guide portion (14) includes a planar surface (15) for matingly receiving one surface of a workpiece (20) and the clamp portion (16) includes a surface (17) for receiving another surface of the workpiece (20). The body member (12) may be formed of various materials including cast aluminum.

An over-center toggle clamp (30) is attached to the surface (17) and includes a mounting bracket (32), a pivotally attached operator handle (34), and over-center link (36), a piston (38), and an adjustable foot (40). It is to be understood that other clamping means, such as a foot-operated air cylinder, could be used if a stationary high production operation is comtemplated.

Figure 2:
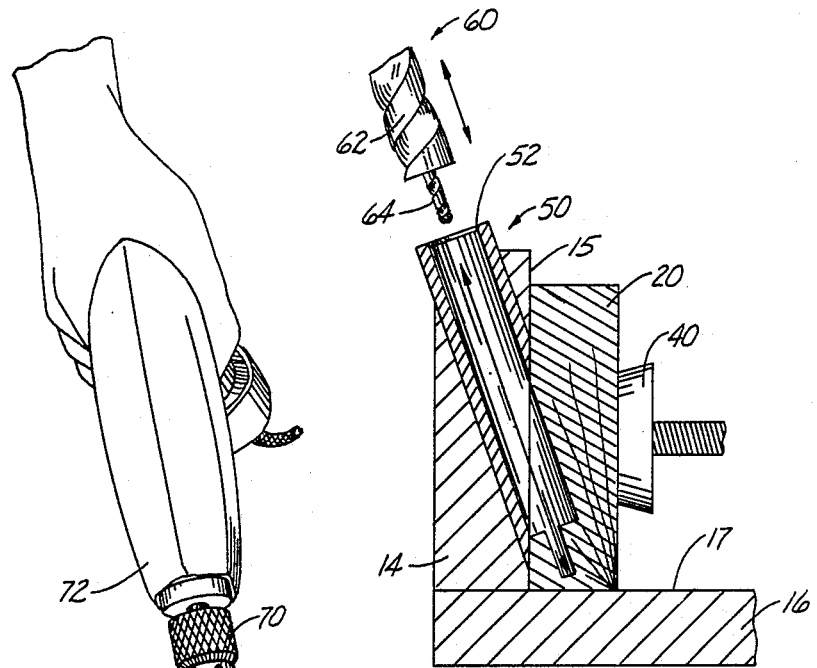
FIG. 2 is a side elevation sectional view taken along line 2—2 of FIG. 1 illustrating the depth of the pocket and pilot hole formed in the wooden workpiece by the stepped drill bit.
Figure 3:
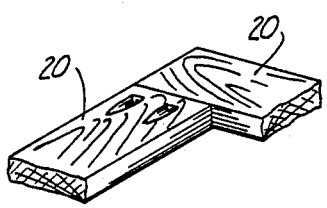
FIG. 3 is a perspective view showing one of a number of possible pocket joints that can be prepared with the holding fixture.

As most clearly shown in FIG. 2, the guide portion (14) carries a guide channel (50) that is angularly disposed with respect to the planar surface (15). Although the angle can vary, an angle of about 14° is preferred for forming pocket joints in wooden workpieces (20). The guide channel (50) is formed of a suitable material such as hardened steel. The lower end of the channel (50) terminates flush with the planar surface (15) above the surface (17), and the upper end forms a stop flange (52). The axial bore (54) of the channel (50) is disposed to receive and guide the shank of a drill bit (60).

The drill bit (60) includes a pocket forming portion (62) and a smaller diameter pilot hole forming portion (64). An adjustable stop collar (66) is selectively secured to the larger portion (62) by a set screw (68). The bit (60) may be secured in the chuck (70) of a portable hand drill (72) as shown in FIG. 1. The stop collar (66) is positioned and secured to the bit (60) so that the stop collar (66) will engage the stop flange (52) when the end of the bit (60) is above the surface (17) of the clamp portion (16). This prevents damage to the surface (17) and, since the bit (60) does not extend through the workpiece (20), no burr is formed on the workpiece (20) to interfer with the preparation of a smooth pocket joint.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. The combination of a holding fixture and a drill bit for use in drilling pocket joints in a workpiece with a drill bit, wherein said combination consists of:
   a stop collar attached to said drill bit at a point positioned a first predetermined distance from the free end thereof;
   an L-shaped body member including a stationary guide portion and a stationary clamp portion disposed normal thereto to form a 90° junction;
   said guide portion including a planar surface for matingly receiving one surface of said workpiece;
   said clamp portion including a surface for receiving another surface of said workpiece;
   moveable and adjustable means for clamping said workpiece in contact with both the guide portion and the clamp portion to secure the workpiece flush against the planar surface of the guide portion; wherein said moveable and adjustable means are disposed on said surface of the clamp portion for receiving said another surface of the workpiece; and,
   a channel formed in said guide portion and being disposed at an angle with respect to said guide portion planar surface such that the channel terminates at an opening in the guide portion planar surface at a point spaced above the 90° junction, said channel having an upper stop flange positioned at a second predetermined distance above the planar surface of said clamp portion wherein said second predetermined distance is greater than said first predetermined distance; whereby, said stop collar on said drill bit engages the stop flange on said channel and a pocket is formed in the workpiece such that the pocket does not extend through the workpiece.

2. The combination of claim 1 wherein said moveable and adjustable clamping means comprise an over-center toggle clamp attached to said clamp portion.

3. The combination of claim 1 wherein said drill bit is a stepped bit having a pocket forming portion and a smaller diameter pilot hole forming portion forming the free end of said drill bit.